(12) United States Patent
Georgitsis et al.

(10) Patent No.: US 9,739,462 B2
(45) Date of Patent: Aug. 22, 2017

(54) LIGHTING SYSTEM WITH PLURALITY OF LED AND HEAT FINS

(71) Applicants: Anthony C. Georgitsis, Edgewood, WA (US); Joseph Biro, Scottsdale, AZ (US); Nicholas B. Irwin, Auburn, WA (US)

(72) Inventors: Anthony C. Georgitsis, Edgewood, WA (US); Joseph Biro, Scottsdale, AZ (US); Nicholas B. Irwin, Auburn, WA (US)

(73) Assignee: Vision Motor Sports, Inc., Algona, WA (US)

(*) Notice: Subject to any disclaimer, the term of this patent is extended or adjusted under 35 U.S.C. 154(b) by 0 days.

(21) Appl. No.: 13/693,157

(22) Filed: Dec. 4, 2012

(65) Prior Publication Data

US 2013/0148351 A1 Jun. 13, 2013

Related U.S. Application Data

(63) Continuation of application No. 29/405,582, filed on Nov. 3, 2011, now Pat. No. Des. 674,949.

(51) Int. Cl.
| | |
|---|---|
| *F21V 31/00* | (2006.01) |
| *F21V 21/30* | (2006.01) |
| *F21V 21/14* | (2006.01) |
| *F21V 23/00* | (2015.01) |
| *B60Q 1/24* | (2006.01) |
| *F21V 27/02* | (2006.01) |
| *F21V 5/00* | (2015.01) |
| *F21V 17/12* | (2006.01) |
| *F21V 29/507* | (2015.01) |

(Continued)

(52) U.S. Cl.
CPC ............... *F21V 21/14* (2013.01); *B60Q 1/24* (2013.01); *F21V 5/007* (2013.01); *F21V 17/12* (2013.01); *F21V 21/30* (2013.01); *F21V 23/00* (2013.01); *F21V 23/008* (2013.01); *F21V 27/02* (2013.01); *F21V 29/507* (2015.01); *F21V 31/005* (2013.01); *F21V 5/04* (2013.01); *F21V 7/0091* (2013.01); *F21Y 2105/10* (2016.08); *F21Y 2115/10* (2016.08)

(58) Field of Classification Search
CPC ............ F21Y 2105/001; F21V 15/013; F21V 31/005; F21V 21/30
USPC ..... 362/236, 237, 240, 249.01, 249.02, 97.3, 362/225, 800
See application file for complete search history.

(56) References Cited

U.S. PATENT DOCUMENTS 4,254,453 A * 3/1981 Mouyard et al. ............ 362/240
4,336,580 A * 6/1982 Mouyard et al. ............ 362/347
(Continued)

*Primary Examiner* — Ismael Negron
(74) *Attorney, Agent, or Firm* — Mark J. Nahnsen; Barnes & Thornburg LLP

(57) ABSTRACT

An auxiliary lighting system includes a housing assembly having a generally planar surface and a lighting unit. The lighting unit includes a lighting module having a printed circuit board and a plurality of light emitting diodes operatively connected to the printed circuit board and a cover assembly including a protective cover, a frame, and a gasket. The lighting unit is assembled such that fasteners connect the frame, the protective cover, and the planar surface of the housing assembly to hold the lighting module between the protective cover and the planar surface and hold the gasket between the protective cover and the planar surface.

17 Claims, 7 Drawing Sheets

(51) Int. Cl.
*F21V 5/04* (2006.01)
*F21V 7/00* (2006.01)
*F21Y 105/10* (2016.01)
*F21Y 115/10* (2016.01)

(56) References Cited

U.S. PATENT DOCUMENTS

| | | | | |
|---|---|---|---|---|
| 4,914,731 A * | 4/1990 | Chen | | 340/815.45 |
| 4,935,665 A * | 6/1990 | Murata | | F21S 48/1394 |
| | | | | 257/E25.02 |
| 6,367,949 B1 * | 4/2002 | Pederson | | 362/240 |
| 6,502,967 B2 * | 1/2003 | Mullen | | F21S 8/022 |
| | | | | 362/285 |
| 6,536,913 B1 * | 3/2003 | Yajima et al. | | 362/231 |
| 6,641,284 B2 * | 11/2003 | Stopa et al. | | 362/240 |
| 6,652,124 B2 * | 11/2003 | Schubert | | F21S 8/02 |
| | | | | 362/148 |
| 7,070,310 B2 * | 7/2006 | Pond et al. | | 362/545 |
| 7,152,997 B1 * | 12/2006 | Kovacik | | F21V 21/06 |
| | | | | 362/191 |
| 7,420,811 B2 * | 9/2008 | Chan | | F21V 29/004 |
| | | | | 361/707 |
| 7,484,866 B1 * | 2/2009 | Buse | | F21S 8/02 |
| | | | | 362/147 |
| 7,513,639 B2 * | 4/2009 | Wang | | 362/218 |
| 7,588,355 B1 * | 9/2009 | Liu et al. | | 362/373 |
| 7,651,253 B2 * | 1/2010 | Shuy | | F21K 9/00 |
| | | | | 362/294 |
| 7,762,690 B2 * | 7/2010 | Li | | F21V 3/00 |
| | | | | 362/267 |
| 7,857,486 B2 * | 12/2010 | Long | | F21K 9/00 |
| | | | | 362/218 |
| 7,914,162 B1 * | 3/2011 | Huang | | 362/92 |
| 8,021,024 B2 * | 9/2011 | Huang | | F21V 15/013 |
| | | | | 362/249.02 |
| 8,025,422 B1 * | 9/2011 | Huang | | F21V 3/02 |
| | | | | 362/241 |
| 8,029,173 B2 * | 10/2011 | Ko | | B60Q 1/0483 |
| | | | | 362/427 |
| 8,047,682 B2 * | 11/2011 | Zheng | | F21S 8/086 |
| | | | | 362/249.01 |
| 8,066,404 B2 * | 11/2011 | Song | | F21S 2/005 |
| | | | | 257/722 |
| 8,087,807 B2 * | 1/2012 | Liu et al. | | 362/373 |
| 8,092,042 B2 * | 1/2012 | Wilcox | | 362/249.02 |
| 8,172,434 B1 * | 5/2012 | Olsson | | 362/346 |
| 8,201,970 B2 * | 6/2012 | Wang | | F21V 17/12 |
| | | | | 362/249.01 |
| 8,246,219 B2 * | 8/2012 | Teng et al. | | 362/311.03 |
| 8,348,461 B2 * | 1/2013 | Wilcox | | F21S 2/005 |
| | | | | 362/240 |
| 8,419,217 B2 * | 4/2013 | Lu | | F21V 29/004 |
| | | | | 362/249.02 |
| 9,494,306 B1 * | 11/2016 | Newton | | F21V 15/01 |
| 2006/0056169 A1 * | 3/2006 | Lodhie | | F21S 8/086 |
| | | | | 362/97.3 |
| 2007/0070618 A1 * | 3/2007 | Talamo et al. | | 362/153.1 |
| 2007/0230185 A1 * | 10/2007 | Shuy | | B60Q 1/20 |
| | | | | 362/294 |
| 2008/0089071 A1 * | 4/2008 | Wang | | 362/294 |
| 2010/0053950 A1 * | 3/2010 | Higuchi et al. | | 362/234 |
| 2012/0106174 A1 * | 5/2012 | Chuang | | F21K 9/137 |
| | | | | 362/375 |
| 2013/0235583 A1 * | 9/2013 | Chang et al. | | 362/249.02 |
| 2014/0063811 A1 * | 3/2014 | Yun | | F21V 3/0445 |
| | | | | 362/294 |
| 2014/0334149 A1 * | 11/2014 | Nolan | | F21V 5/007 |
| | | | | 362/235 |

\* cited by examiner

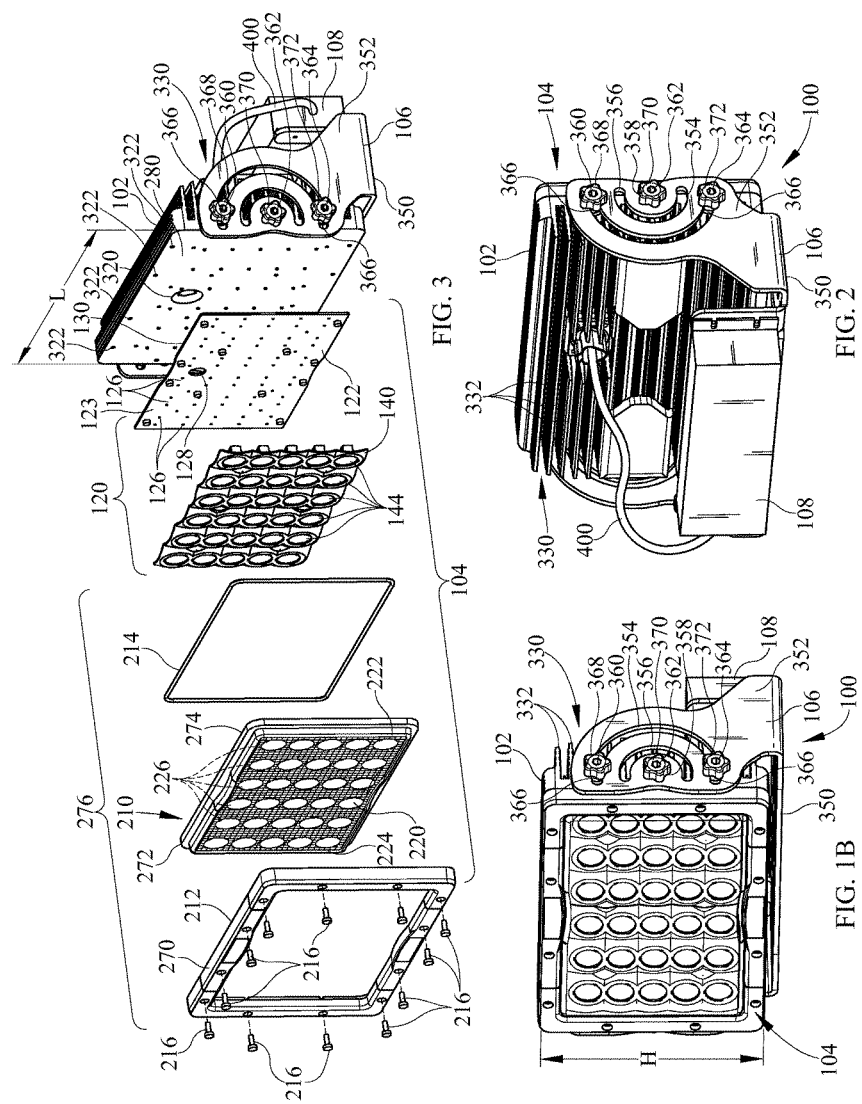

LIGHTING SYSTEM WITH PLURALITY OF LED AND HEAT FINS

CROSS REFERENCE TO RELATED APPLICATIONS

The present application is a Continuation of copending U.S. Design application Ser. No. 29/405,582, filed Nov. 3, 2011, which is herein incorporated by reference in its entirety.

BACKGROUND OF THE INVENTION

1. Field of the Invention

The present invention relates generally to an auxiliary lighting systems and, more particularly, to modular auxiliary lighting systems for providing vehicles and other structures.

2. Description of the Background of the Invention

Effective external lighting is important to the safe operation of vehicles in low light environments. In general, effective external vehicle lighting systems should exhibit a maximum output of useful illumination at a level of current draw within the capacity of the vehicle's electrical system, a physical size appropriate for the particular type and size of vehicle, and in-service durability consistent with the operational dynamics of the vehicle to which the system is equipped. In particular, dependent on the environment in which a vehicle is used, it is oftentimes useful or even necessary for a lighting system to be completely waterproof and/or may be necessary to prevent dust, dirt, and/or other particles from entering a lighting unit of the lighting system.

At least one current lighting system includes a housing, a lighting module disposed within the housing, a cap and gasket enclosing a front portion of the housing adjacent the lighting module, and end caps and respective gaskets for enclosing ends of the housing. The gaskets provide three areas of sealing, but also provide three areas in which water, dirt, dust, and/or other particles can enter the lighting system.

SUMMARY

According to one aspect of the present invention, an auxiliary lighting system includes a housing assembly having a generally planar surface and a lighting unit. The lighting unit includes a lighting module having a printed circuit board and a plurality of light emitting diodes operatively connected to the printed circuit board and a cover assembly including a protective cover, a frame, and a gasket. The lighting unit is assembled such that fasteners connect the frame, the protective cover, and the planar surface of the housing assembly to hold the lighting module between the protective cover and the planar surface and hold the gasket between the protective cover and the planar surface.

In a different aspect of the present invention, an auxiliary lighting system includes a housing assembly having a generally planar surface and a lighting unit. The lighting unit includes a lighting module having a printed circuit board and a plurality of light emitting diodes operatively connected to the printed circuit board, a lens positioner disposed adjacent the printed circuit board and aligned with the light emitting diodes, and a plurality of lenses disposed within the lens positioner for directing light from the light emitting diodes. The lighting unit further includes a cover assembly including a protective cover having an outer peripheral edge and an inner peripheral edge, a frame having an inner peripheral edge, and a gasket. The lighting unit is assembled such that fasteners connect the frame, the protective cover, and the planar surface of the housing assembly and the inner peripheral edge of the frame is disposed adjacent the outer peripheral edge of the protective cover and the inner peripheral edge of the protective cover is disposed adjacent the gasket to retain the protective cover, the gasket, and the lighting module firmly against the planar surface. The absence of end caps within the lighting system minimizes a number of points at which contaminants can enter the lighting system.

In a further aspect of the present invention, a modular lighting system includes a housing assembly having a first length and a first height and a lighting unit. The lighting unit includes a lighting module including a printed circuit board and a plurality of light emitting diodes operatively connected to the printed circuit board and a cover assembly including a protective cover. The lighting unit has a second height that is generally the same as the first height and a second length that is generally equal to or less than the first length. If the second length is generally the same as the first length, a single lighting unit is attached to the housing assembly and, if the second length is less than the first length, more than one lighting unit is attached to the housing assembly.

BRIEF DESCRIPTION OF THE DRAWINGS

FIG. 1B is an isometric view of the top, front, and an opposite side of the lighting system shown in FIG. 1A and additionally depicting an orientation and placement of lighting elements within the lighting unit;

FIG. 2 is an isometric view of the top, a rear, and the side of the lighting system of FIG. 1A and further depicting a heat dissipating portion of the lighting system, the power source, and an electrical supply cord connecting the power source to the housing assembly;

FIG. 3 is an exploded view similar to the view of FIGS. 1A and 1B and depicting a composite printed circuit board, a lens positioner, a plurality of lenses, a gasket, a protective cover, and a frame, all of which form the lighting unit;

Other aspects and advantages of the present invention will become apparent upon consideration of the following detailed description, wherein similar structures have like or similar reference numerals.

DETAILED DESCRIPTION

Figure 1A:
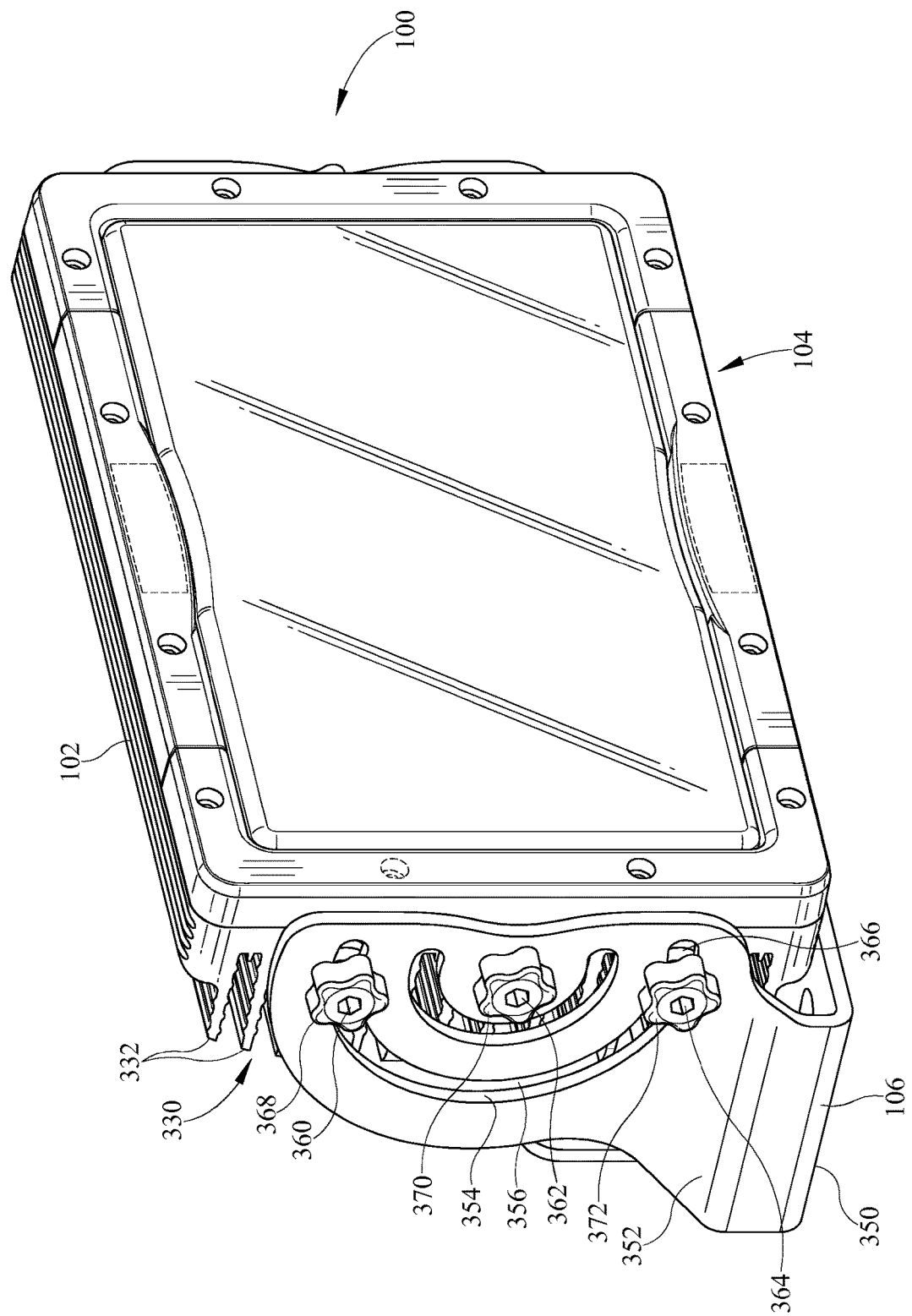
FIG. 1A is an isometric view of a top, front, and side of a first embodiment of a lighting system comprising a housing assembly carrying a single lighting unit, a mounting system for attaching the lighting system to a vehicle or other structure, and a power source for providing power to the lighting system.

The present invention is directed to a vehicle lighting system. While the present invention may be embodied in many different forms, several specific embodiments are discussed herein with the understanding that the present invention is to be considered only as an exemplification of the principles of the invention, and it is not intended to limit the invention to the embodiments illustrated.

FIGS. 1A, 1B, and 2-4 depict a first embodiment of an auxiliary lighting system 100 of the present invention. The auxiliary lighting system 100 generally includes a housing assembly 102 carrying at least one lighting unit 104, a mounting system 106, and a power source 108.

The lighting unit 104 includes an internal light-generating component in the form of a linear light module 120, as shown in FIG. 3. The linear light module 120 comprises a composite printed circuit board (CPCB) 122 having on a front surface 123 a plurality of compact, light-generating elements 126 extending therefrom. The light-generating elements 126 of the linear light module 120 comprise electrically driven light emitting diodes (LEDs). LEDs 126 are most preferred because of their compact size, in-service durability, low power consumption, instantaneous response, and relatively high light output. Each LED 126 preferably comprises an individual emitter package mounted to the CPCB 122 using a unique heat-rejecting mounting arrangement, as discussed in application Ser. No. 13/091,326, entitled "Auxiliary Lighting Systems," the disclosure of which is hereby incorporated by reference in its entirety. Center-to-center spacing of individual LEDs 126 occurs at consistent intervals, enabling the development of modular embodiments, as discussed below.

Each LED 126 preferably comprises a low-voltage direct current (DC) operated emitter. One sample emitter includes the EDISON KLC8 LED and another sample 3-watt LED package is produced under the Luxeon trademark by Philips Lumileds Lighting Company of San Jose, Calif. The outer encapsulating package of the LED 126 preferably comprises a clear cover or lens element, which is generally hemispherical in shape and from which light from the LED 126 is directed.

The CPCB 122 preferably comprises circuitry adapted to supply suitable electrical current to each of the plurality of mounted LEDs 126. The preferred implementation of such circuitry is dependent on several design factors including the number of LEDs 126 within linear light module 120, operational specifications of the selected LEDs, and manufacturers recommendations for the application and use of such LEDs. Thus, engineering and design of preferred embodiments of the CPCB 122 may include the integration of electronic components/devices to control current and or voltage supplied to the LEDs 126, as selected and applied by one of ordinary skill in the art.

Another aspect of the CPCB 122 is the efficient heat dissipation and transfer feature provided by the novel composite structure of the CPCB 122. The CPCB 122 preferably comprises a multi-layer assembly designed to control the level of thermal heat generated by the LEDs 126 during operation. It is known that excessive heat can reduce both the efficiency and lifespan of an LED. The CPCB 122 is designed to maintain the LEDs 126 within the component's maximum rated temperature during operation. Thermal control by the CPCB 122 may be accomplished by shunting thermal energy generated by the LEDs from the CPCB 122 to the ambient environment, as will be discussed in further detail hereinafter.

As can best be seen in FIG. 3, the CPCB 122 also includes a generally circular aperture 128 extending through the CPCB 122 near a top edge 130 thereof, which will be discussed in greater detail below.

Referring again to FIG. 3, the linear light module 120 further includes a plurality of lens positioner 140 including a number of cavities holding focusing lenses 144. The lens positioner 140 is adapted to position the focusing lenses 144 in an operable position adjacent the CPCB 122. The focusing lenses 144 may be provided in modules of two, four, or any other number of lenses or may be provided individually. The lens positioner 140 can be a single module or can be separate interconnected segments.

Figure 5:
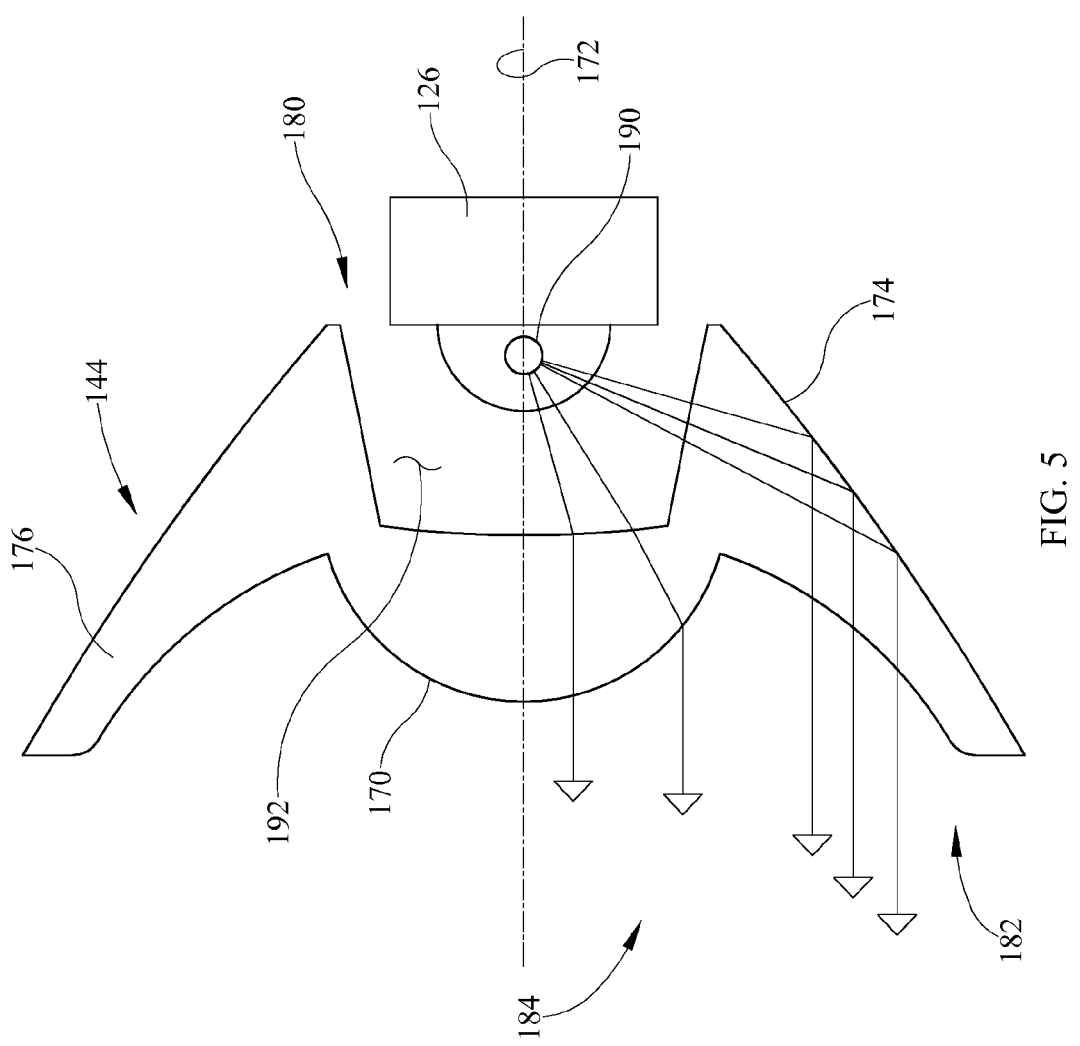
FIG. 5 is a schematic sectional view of a single focusing lens for focusing light emitted by a lighting element.

FIG. 5 depicts a schematic sectional view through a single focusing lens 144. The lens 144 includes a central refractive member 170 located symmetrically around an optical axis 172 and a total internal reflection (TIR) surface 174 located symmetrically around the refractive member 170. Both the refractive member 170 and the TIR surface 174 are integrated within a rotationally symmetrical, solid transparent body 176. The lens 144 comprises an input end 180 adapted to receive light generated by the LED 126 and an output end 182 from which a generally collimated beam pattern 184 is projected. The TIR surface 174 generally approximates a frusticonical section. The preferred shape of the TIR surface 174 is chosen such that light originating from the LED 126 is emitted by the optical system in a direction substantially parallel to the optical axis 172. The outer TIR surface 174 may optionally comprise a true linear conic section, a spherical section, a hyperbolic curve, or an ellipsoidal section.

In the depicted embodiment of the lens 144, the refractive member 170 and the TIR surface 174 comprise a substantially concomitant focal point 190. The focal point 190 is preferably located on the optical axis 172 within an internal recess 192 of input end 180. The internal recess 192 is structured and arranged to enable the output of the LED 126 to be located at the focal point 190. The TIR surface 174 is configured generally in accordance with the well-known principals of TIR optics. Total internal reflection (TIR) occurs when a light ray traveling in a transparent material encounters an interface with another transparent, but less optically dense material. The lens 144 is preferably fabricated from a clear material such as glass or more preferably an optically-clear plastic.

The arrows in FIG. 5 depict the optical path of light generated by the LED 126. The light is focused by the lens 144 into a substantially parallel beam pattern 184, either by refraction at the central refractive member 170 or by reflection at the TIR surface 174. The TIR surface 174 is oriented such that light originating from the LED 126 and impinging on the TIR surface 174 forms a parallel light beam extending substantially parallel to the optical axis 172 (by reflection). The remaining light originating from the LED 126 is collimated by the central refractive member 170 (by refraction). Thus, a significant and useful portion of the light originating from the LED 126 is redirected entirely within the lens 144. This avoids the need for additional external reflectors, for example, the application of a reflective coating to the surface of the lens positioner 140.

Referring again to FIG. 3, the lighting unit 104 further includes a protective cover 210, a frame 212, and a gasket 214 that cover the light module 120 and which are attached to the housing 102 by fasteners 216. The protective cover 210 preferably includes a substantially transparent composition enabling the outward passage of light produced by the LEDs 126 and includes first and second sides 220, 222 with a protective layer 224 disposed on the first side 220 and adapted to protect the light module 120 from the environment. The protective layer 224 includes glass, a screen, and/or any other material that would shield the light module 120 from water, dirt, wind, and the like. The protective layer 224 further includes a plurality of apertures 226 disposed through the second side 222 and aligned with the individual lenses 144 and the LEDs 126. The lighting unit 104 is assembled by positioning the frame 212 with a peripheral edge 270 over an outer peripheral edge 272 of the protective cover 210 and positioning the gasket 214 adjacent an inner peripheral edge 274 of the protective cover 210 to form a cover module 276. The CPCB 122 with the lens positioner 140 and the lenses 144 are positioned against an outer surface 280 of the housing assembly 102 to create the light module 120, the cover module 276 is placed over the light module 120, and the fasteners 216 are utilized to attach the cover module 276 to the outer surface 280 of the housing assembly 102 with all elements of the lighting unit 104 sandwiched therebetween. After assembly, the gasket 214 provides a single seal between the lighting unit 104 and the housing assembly 102. The seal formed by the gasket 214 prevents the intrusion of dust, water, dirt, debris, wind, and/or other contaminants from entering the lighting unit 104.

Referring to FIGS. 1A, 1B, 2, and 3, the housing assembly 102 includes the outer or front surface 280 to which the lighting unit 104 is attached and an aperture 320 extending through the outer surface 280 of the housing assembly 102, the function of which will be described in detail below. The outer surface 280 is preferably planar for ease in attachment of the lighting unit 104 thereto. A plurality of fastening bores 322 are also disposed in the outer surface 280 for attachment of the fasteners 216. While the fasteners 216 and bores 322 are generally shown and described as screws and threaded bores, any attachment mechanism known in the art may be utilized for attaching the lighting unit 104 to the housing assembly 102, so long as the gasket 214 is compressed to form a seal therebetween and the attachment mechanism reliably retains the lighting unit 104 on the housing assembly 102. Examples of other attachment mechanisms include, but are not limited to, bolts, clamps, and/or other mechanisms, and combinations thereof.

Figure 4:
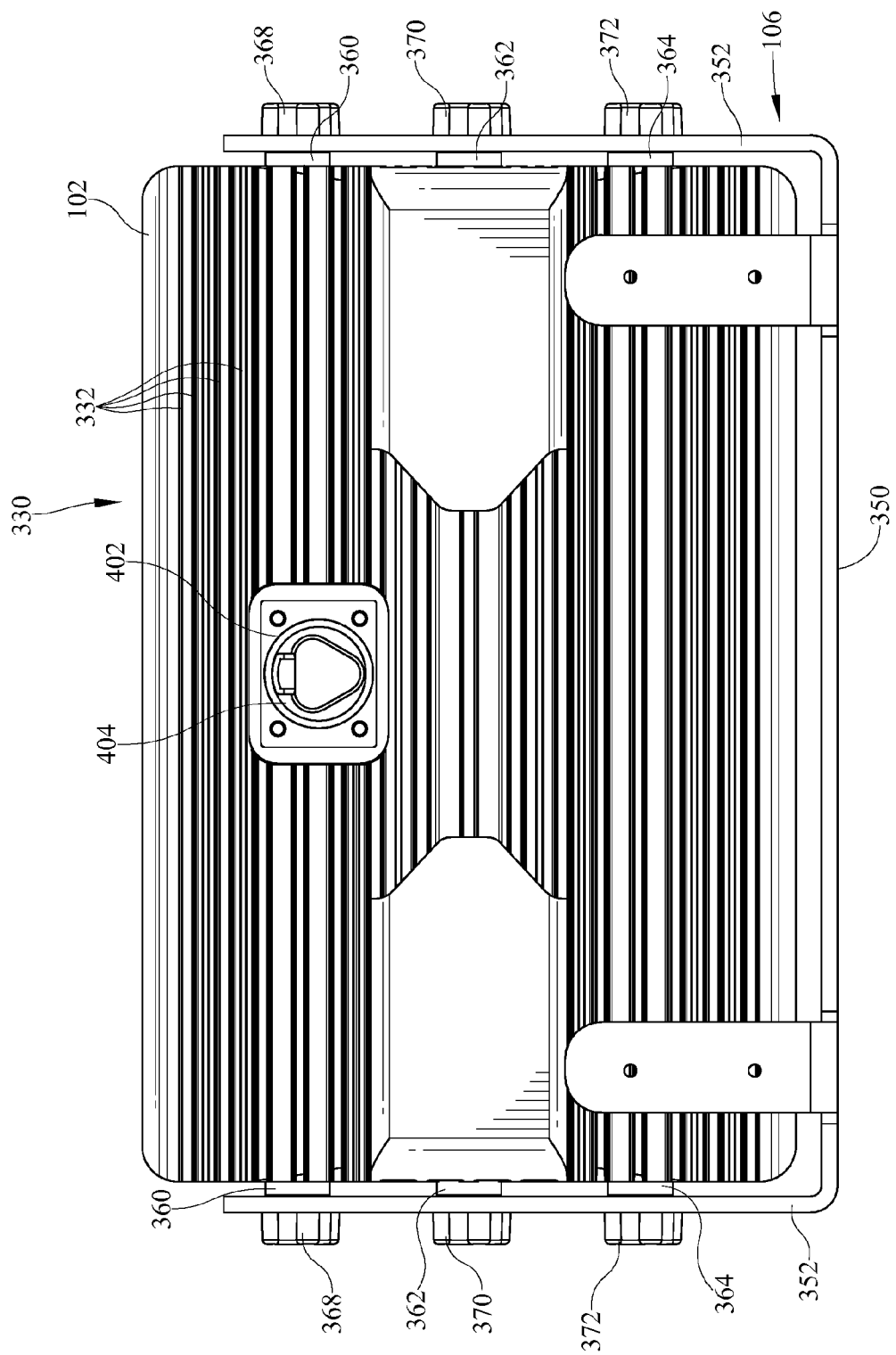
FIG. 4 is a rear elevational view of the lighting system of FIG. 1A further depicting a sealing grommet for creating a seal between the housing assembly and the electrical supply cord.
Figure 7:
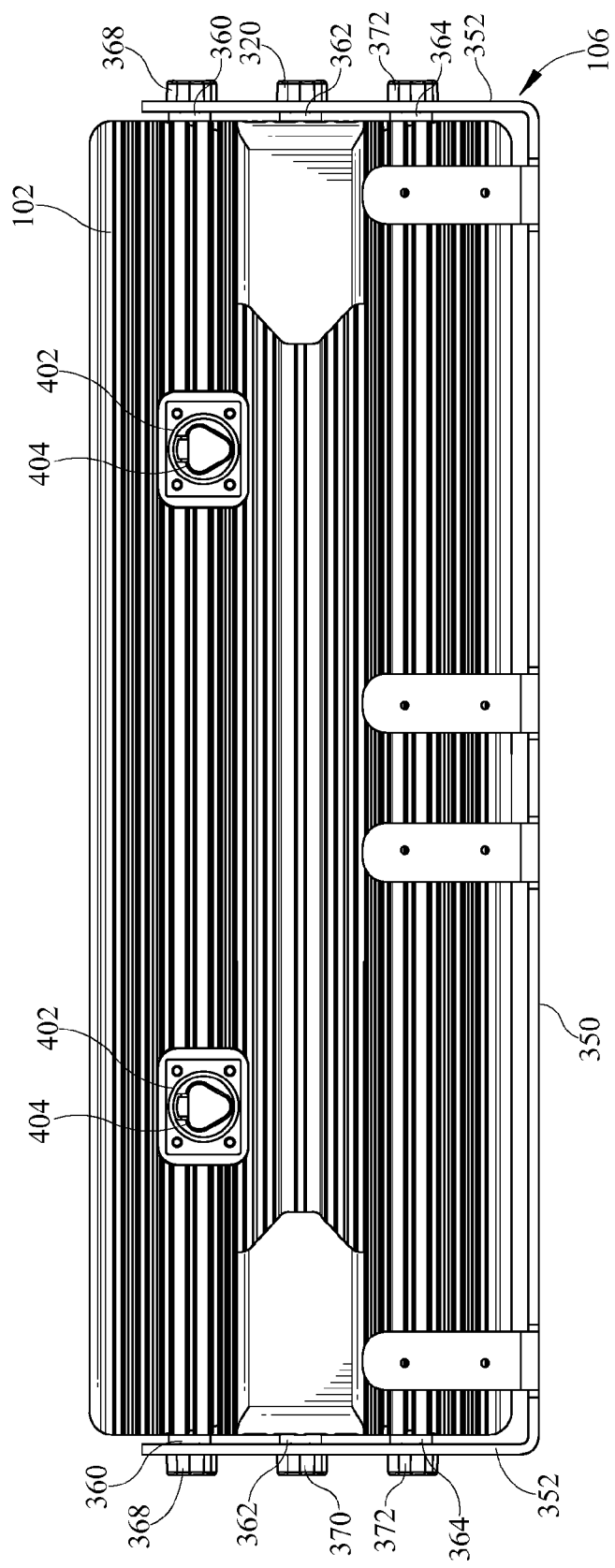
FIG. 7 is a rear elevational view of the lighting system of FIG. 6 further depicting two sealing grommets for creating seals between the housing assembly and two electrical supply cords.
Figure 8:
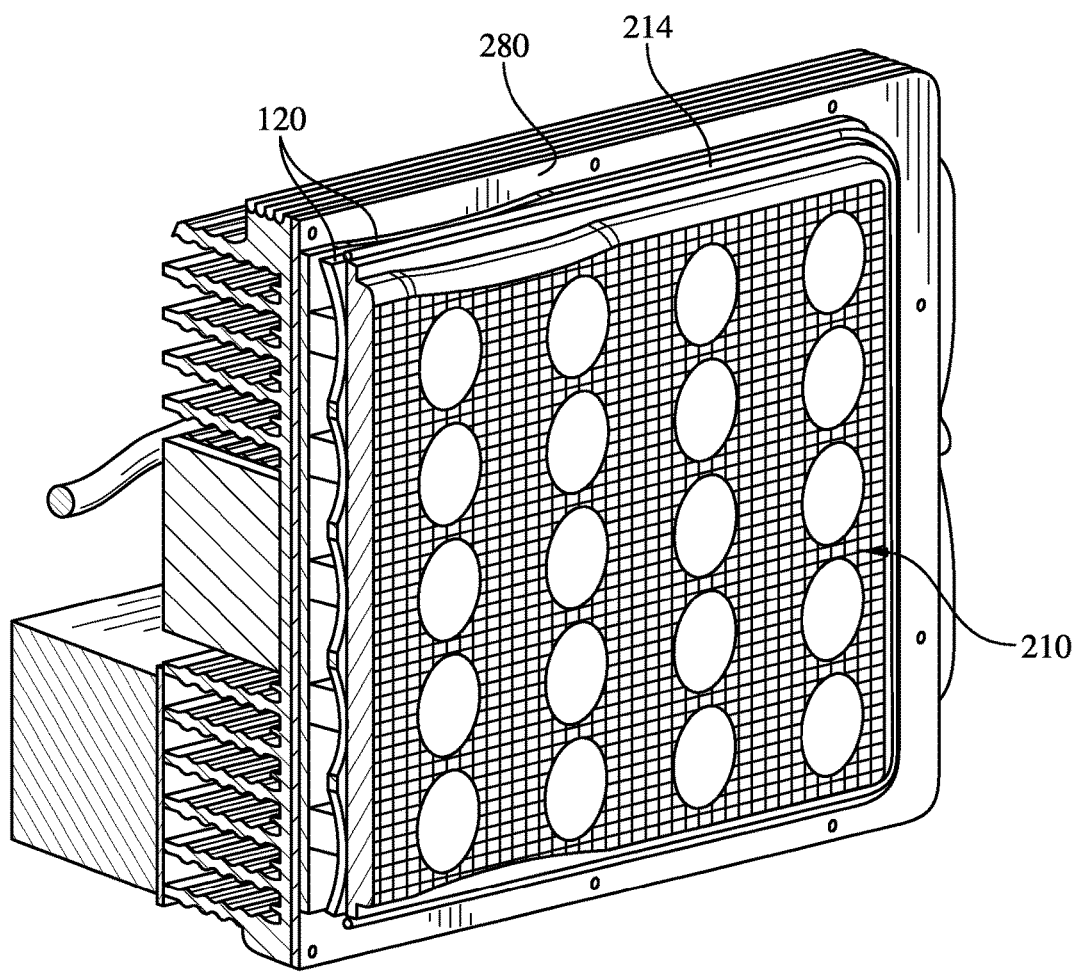
FIG. 8 is a sectional view of FIG. 1*a*

The housing assembly 102 further includes a rear portion 330 formed by a plurality of heat dissipating fins 332. The fins 332 are heat dissipating in that heat generated by the LEDs 126 (and/or any other component of the lighting system 100) during operation of the lighting system 100 is rejected to the surrounding environment through the fins 332, rather than being retained within the lighting system 100. The fins 332 are preferably integrally formed with the remainder of the housing assembly 102. The shape of the fins 332 serves to increase the heat-dissipation of the lighting system 100 by increasing the overall heat-rejecting surface area of the housing assembly 102. As shown in FIGS. 1a, 4 and 7, the housing, as an extrusion, has a generally uniform cross section along its length with the exception of machined features such as holes or recesses.

The housing assembly 102 is preferably constructed from a rigid material having good thermal conduction characteristics, preferably comprising a heat-transfer coefficient in the range of between about 75 and 235 W m−1 K−1 W/m K. In addition, the preferred material for the housing assembly 102 must be capable of sustaining a continuous operational temperature of at least 85 degrees Centigrade without degradation. Preferred materials include metallic compositions, for example, an extrusion-formed aluminum alloy. Upon reading the teachings of this specification, those of ordinary skill in the art will now understand that, under appropriate circumstances, considering such issues as intended use, material cost, etc., other arrangements, such as the use of composite structures, engineered plastics, alternate metals, etc., may suffice.

Referring again to FIGS. 1A, 1B, and 2-4, the mounting system 106 for the lighting system 100 can be seen. The mounting system 106 includes a generally planar mounting structure 350 that is utilized to mount the lighting system 100 to a vehicle or other structure in any fashion known in the art. The mounting system 106 further includes first and second brackets 352 extending perpendicularly away from the mounting structure 350. Each of the brackets 352 includes a first hemispherical aperture 354, a second hemispherical aperture 356 having a smaller radius than the first hemispherical aperture 354, and a circular aperture 358. Three posts 360, 362, 364 extend outwardly from the housing assembly 102 such that outer posts 360, 364 extend into opposite ends 366 of the first hemispherical aperture 354 and a central post 362 extends through the circular aperture 358. Corresponding knobs 368, 370, 372 are attached to the posts 360, 362, 364, respectively, for attaching and retaining the housing assembly 102 within the mounting system 106.

As best seen in FIG. 2, electrical power to energize lighting system 100 is routed from a power source 108, either as part of the system 100 or a part of the vehicle or other structure, to lighting unit 104 by means of at least one electrical supply cord 400, preferably routed through a feed-through aperture 402 (FIG. 4) formed in the rear portion 330 of the housing assembly 102 within the fins 332. The electrical supply cord 400 is electrically coupled to both the lighting unit 104 and at least one electrical power source 108 (for example, a transformer). The electrical supply cord 400 comprises at least one electrical conductor (when a grounded vehicle chassis is utilized to complete the circuit). The electrical supply cord 400 may include an annular sealing grommet 404 structured and arranged to form a substantially fluid-resistant seal between the electrical supply cord 400 and the feed-through aperture 402. The annular sealing grommet 404 is disposed about the electrical supply cord 400 and may be molded integrally with an outer sheath of the supply cord 400. The annular sealing grommet 404 comprises a generally resilient material capable of forming a compression seal with the feed-through aperture 402 to prevent entry of water, dirt, wind, and the like.

The supply cord 400 extends through the feed-through aperture 402 and is electrically connected to one or more wires or other electrical connectors (not shown). The electrical connectors are fed through the aperture 320 in the outer surface 280 of the housing assembly 102 and the aperture 128 in the CPCB 122 to provide power to the CPCB 122 and the LEDs 126.

Referring again to FIGS. 1A, 1B, 2, and 3, the lighting system 100 uses a modular design in relation to the housing assembly 102 and the lighting unit 104 to allow for the development of variable embodiment length lighting systems 100. In the past, two or more housing assemblies were connected to form variable length housings and endcaps were used at ends of the connected housing assemblies, but this multiplies the number of points at which water, dirt, dust, debris, etc. can enter the lighting system 100 and potentially cause a failure of the lighting system 100. The design of the light systems 100 herein allows for variable length housing assemblies 102 to be extruded, but minimizes a number of points at which water, dirt, wind, and the like can enter the lighting system 100. In particular, in one embodiment, each housing may have a minimum length L of about 2 inches and height H of about 2 inches. In this embodiment, an extruder for creating the housing assemblies 102 would therefore be capable of extruding housing assemblies 102 with variable lengths L and a consistent height H.

Figure 6:
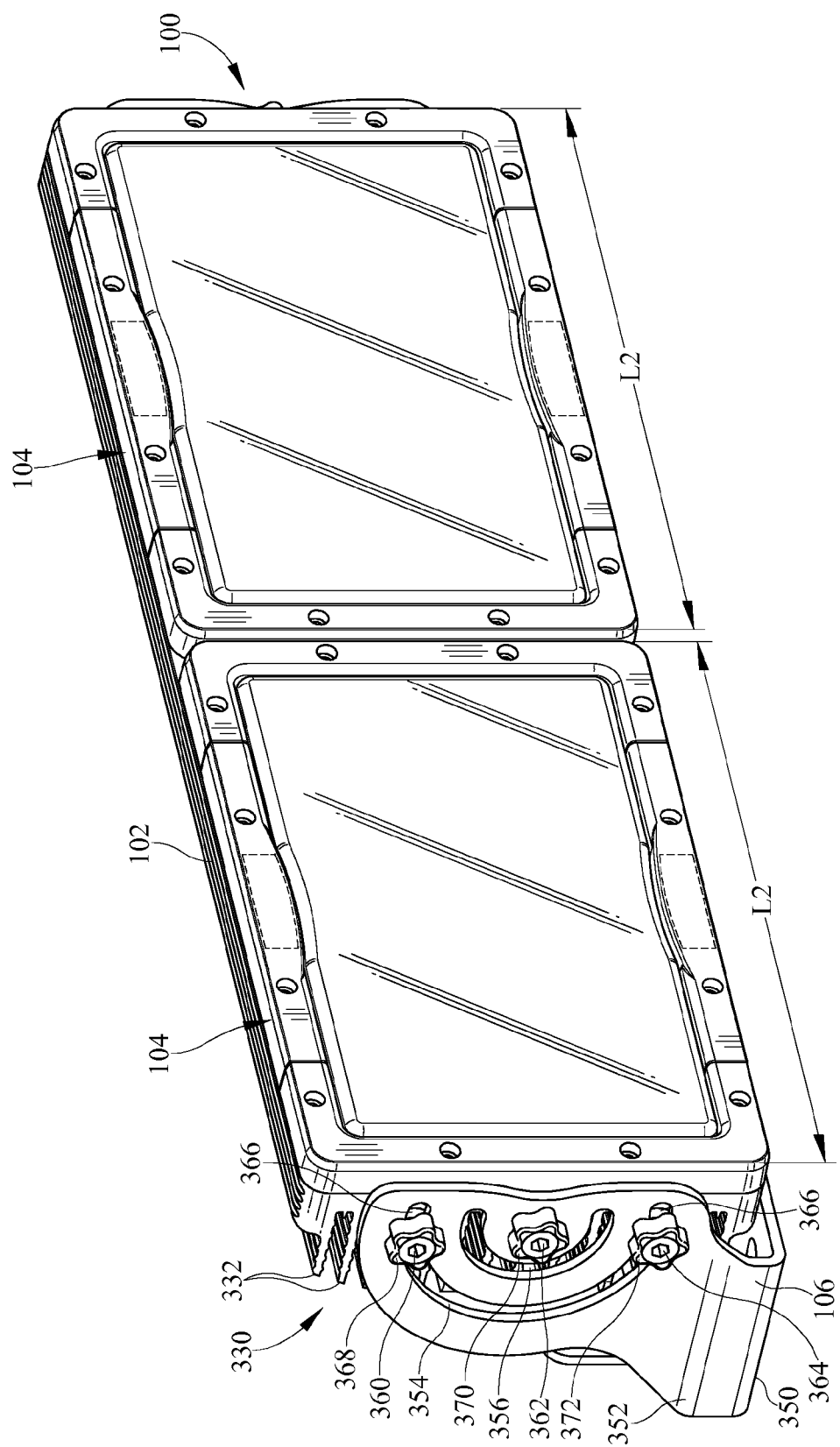
FIG. 6 is an isometric view of a top, front, and side of a second embodiment of a lighting system comprising a housing assembly carrying two lighting units, a mounting system for attaching the lighting system to a vehicle or other structure, and a power source for providing power to the lighting system.

The lighting units 104 may be designed based on preferred lengths L for the overall lighting systems 100. In a first example, if lighting systems 100 having intervals of about 6 inches (i.e., 6 inches, 12 inches, 18 inches, 24 inches, 30 inches, 36 inches, etc.) are desired, the lighting unit 100 may have a length L2 of 6 inches (see FIG. 6). In such case, if a 12 inch lighting system 100 is needed, a housing assembly 102 of 12 inches is extruded and two 6 inch lighting units 104 are attached to the housing assembly 102 in the manner described with respect to FIGS. 1A, 1B, and 2-4. FIGS. 6 and 7, depict an embodiment of a lighting system 100 having a length L2 that accommodates two lighting units 104. As can be seen in FIG. 7, a separate electrical supply cord 400 may be utilized for each lighting unit 104. Optionally, a single electrical supply cord 400 may be utilized with a plurality of wires (not shown) fed through the housing assembly 102 to each of the lighting units 104.

In the first example, if a 24 inch lighting system 100 is needed, a housing assembly 102 of 24 inches is extruded and four 6-inch lighting units 104 are attached to the housing assembly 102 in the manner described with respect to FIGS. 1A, 1B, and 2-4.

In a second example, if lighting systems 100 having intervals of about 8 inches (i.e., 8 inches, 16 inches, 24 inches, 32 inches, 40 inches, etc.) are desired, the lighting unit 104 may have a length L2 of 8 inches. In this example, if a 80 inch lighting system 100 is needed, a housing assembly 102 of 80 inches is extruded and ten 8 inch lighting units 104 are attached to the housing assembly 102 in the manner described with respect to FIGS. 1A, 1B, and 2-4.

In a further example, inconsistent intervals may be needed for different lighting systems 100. For example, lighting systems 100 of 8, 10, 14, 16, 20, 26, 30, 32, etc. inches may be necessary, but it is not possible for a single size of lighting unit 104 to create all of such lighting systems 100. In such case, multiple sizes of lighting units 104 may be utilized to create different sizes of lighting systems 100. For example, if a lighting system 100 of 30 inches is desired and lighting units 104 of 2, 4, and 8 inches are available, the lighting system 100 may be created by extruding a 30 inch housing assembly 102 and attaching three 8 inch lighting units 104, one 4 inch lighting unit 104, and one 2 inch lighting unit 104. Similarly, if a lighting system 100 of 20 inches is desired, two 8 inch lighting units 104 and one 4 inch lighting unit 104 may be utilized.

As should be understood by a person having skill in the art, any variety of sizes for the housing assemblies 102 may be desired and/or created and any variety of sizes of lighting units 104 may be desired and/or created depending on the intended uses for the lighting systems 100 and the desired sizes of lighting systems 100. Also, it should be understood that, while the lighting units 104 depicted herein include six LEDs along a length L and five LEDs along a height H, any number of LEDs (and corresponding lenses 144) may be utilized depending on an application and/or the size of lighting unit 104.

Although the only specific structure to which the lighting systems 100 herein are disclosed as being attached to are vehicles, any of the lighting systems 100 may be utilized with any moving or nonmoving structure.

Although direction terminology is used herein, for example, top, bottom, rear, front, etc., such terminology is not intended to limit the present invention. Rather, such terminology is intended to describe an orientation of particular elements with respect to other elements. The lighting systems may be attached to any vehicle or other structure and may be disposed in orientation. For example, the mounting surface 350 may be attached to a vertical or horizontal surface or an inclined surface. In addition, the mounting surface 350 may be attached to a horizontal surface such that the lighting unit is disposed above the mounting surface 350, may be attached to a horizontal surface such that the light unit is suspended below the mounting surface 350, or may be attached in any other way known in the art or contemplated by a user of the lighting systems 100.

We claim:

1. An auxiliary lighting system comprising:
a housing comprising a planar surface on a first side of the housing and a plurality of fins that extend outward from a second side of the housing opposite the first side, the plurality of fins extending along the housing;
a light module comprising a circuit board, a plurality of light emitting diodes operatively connected to the circuit board, and a lens positioner comprising a plurality of focusing lenses, each of the plurality of focusing lenses aligned with a corresponding one of the plurality of light emitting diodes and configured to direct light emitted from the light emitting diodes in a substantially common direction away from the planar surface; and
a cover module comprising a protective cover, a gasket, and an outer frame;
wherein the light module is positioned to lie along the planar surface of the housing, the protective cover is sized to surround and enclose the light module relative to the planar surface of the housing, and the outer frame is configured to engage with the housing and the protective cover to compress the gasket against the protective cover and the planar surface of the housing to form a seal around a perimeter of the light module.

2. The auxiliary lighting system of claim 1, wherein the housing is formed to include an aperture extending through the second side to the first side of the housing and configured to receive electrical wiring, and wherein a seal element is positioned in the aperture to form a seal with the housing to block liquid from passing through the aperture.

3. The auxiliary lighting system of claim 2, wherein the gasket, the protective cover, the housing, and the seal element cooperate to block liquid from engaging with the circuit board.

4. The auxiliary lighting system of claim 1, further comprising a mounting system coupled to opposing ends of the housing for mounting the housing to a moving or a non-moving structure and configured to allow an angular adjustment of the planar surface of the housing relative to the moving or non-moving structure to change a direction of light emitted from the light emitting diodes relative to the moving or non-moving structure.

5. The auxiliary lighting system of claim 4, wherein the mounting system comprises a mounting portion, a first bracket coupled to the mounting portion, and a second bracket coupled to the mounting portion and spaced apart from the first bracket, and wherein at least one of the first bracket and the second bracket is formed to include an arcuate slot and a hole.

6. The auxiliary lighting system of claim 5, further comprising a first post extending outwardly from the housing into the arcuate slot, a second post extending outwardly from the housing into the hole, and a knob coupled to the first post and configured to engage with the mounting system to block angular movement of the housing relative to the mounting system at the selection of a user.

7. The auxiliary lighting system of claim 6, further comprising a third post extending outwardly from the housing into arcuate slot and a knob coupled to the third post and configured to engage with the mounting system to block angular movement of the housing relative to the mounting system at the selection of a user.

8. The auxiliary lighting system of claim 7, further comprising a knob coupled to the second post and configured to engage with the mounting system to block angular movement of the housing relative to the mounting system at the selection of a user.

9. An auxiliary lighting system comprising:
a housing comprising a planar surface on a first side of the housing and a plurality of fins that extend outward from a second side of the housing opposite the first side, the plurality of fins extending along the housing;
a first lighting unit coupled to a first portion of the planar surface; and
a second lighting unit coupled to a second portion of the planar surface adjacent the first portion;
each of the first and second lighting units comprising:
  a light module comprising a circuit board, a plurality of light emitting diodes operatively connected to the circuit board, and a lens positioner comprising a plurality of focusing lenses, each of the plurality of focusing lenses aligned with a corresponding one of the plurality of light emitting diodes and configured to direct light emitted from the light emitting diodes in a substantially common direction away from the planar surface; and
  a cover module comprising a protective cover, a gasket, and an outer frame;
  wherein the light module is positioned to lie along the planar surface of the housing, the protective cover is sized to surround and enclose the light module relative to the planar surface of the housing, and the outer frame is configured to engage with the housing and the protective cover to compress the gasket between the protective cover and the planar surface of the housing to form a seal around a perimeter of the light module.

10. The auxiliary lighting system of claim 9, wherein the gasket, the protective cover, and the housing cooperate to block liquid from engaging with the circuit board.

11. The auxiliary lighting system of claim 9, further comprising a mounting system coupled to opposing ends of the housing for mounting the housing to a moving or a non-moving structure and configured to allow an angular adjustment of the planar surface of the housing relative to the moving or non-moving structure to change a direction of light emitted from the light emitting diodes relative to the moving or non-moving structure.

12. The auxiliary lighting system of claim 11, wherein the plurality of fins extend in a substantially common direction along the housing between the opposing ends of the housing.

13. The auxiliary lighting system of claim 12, wherein the first lighting unit is coupled to the planar surface adjacent to one of the opposing ends of the housing and the second lighting unit is coupled to the planar surface adjacent to the other of the opposing ends of the housing.

14. The auxiliary lighting system of claim 11, wherein the mounting system comprises a mounting portion, a first bracket coupled to the mounting portion, and a second bracket coupled to the mounting portion and spaced apart from the first bracket, and wherein at least one of the first bracket and the second bracket is formed to include an arcuate slot and a hole.

15. The auxiliary lighting system of claim 14, further comprising a first post extending outwardly from the housing into the arcuate slot, a second post extending outwardly from the housing into the hole, and a knob coupled to the first post and configured to engage with the mounting system to block angular movement of the housing relative to the mounting system at the selection of a user.

16. The auxiliary lighting system of claim 15, further comprising a third post extending outwardly from the housing into arcuate slot and a knob coupled to the third post and configured to engage with the mounting system to block angular movement of the housing relative to the mounting system at the selection of a user.

17. The auxiliary lighting system of claim 16, further comprising a knob coupled to the second post and configured to engage with the mounting system to block angular movement of the housing relative to the mounting system at the selection of a user.

\* \* \* \* \*